United States Patent
Kacmarcik et al.

(10) Patent No.: US 10,027,764 B2
(45) Date of Patent: Jul. 17, 2018

(54) ASSOCIATING NETWORK-HOSTED FILES WITH NETWORK-HOSTED APPLICATIONS

(71) Applicant: GOOGLE INC., Mountain View, CA (US)

(72) Inventors: Gary Kacmarcik, Bothell, WA (US); James Weatherall, Kirkland, WA (US); Stephen John Konig, Newcastle, WA (US); Alex Pakhunov, Kirkland, WA (US); Sergey Yurevich Ulanov, Bellevue, WA (US)

(73) Assignee: Google LLC, Mountain View, CA (US)

( * ) Notice: Subject to any disclaimer, the term of this patent is extended or adjusted under 35 U.S.C. 154(b) by 225 days.

(21) Appl. No.: 14/145,242

(22) Filed: Dec. 31, 2013

(65) Prior Publication Data

US 2015/0188990 A1    Jul. 2, 2015

(51) Int. Cl.
H04L 29/08    (2006.01)

(52) U.S. Cl.
CPC ................... H04L 67/16 (2013.01)

(58) Field of Classification Search
CPC ........................................ H04L 67/16
USPC ........................................ 709/203
See application file for complete search history.

(56) References Cited

U.S. PATENT DOCUMENTS

| | | | |
|---|---|---|---|
| 6,047,312 A | 4/2000 | Brooks et al. | |
| 6,836,794 B1* | 12/2004 | Lucovsky | G06F 8/61 709/223 |
| 6,959,320 B2* | 10/2005 | Shah | G06F 8/65 709/203 |
| 7,409,405 B1 | 8/2008 | Masinter et al. | |
| 7,721,281 B1* | 5/2010 | Cherepov | G06F 21/55 717/171 |
| 8,014,615 B2 | 9/2011 | Uro | |
| 8,631,342 B2* | 1/2014 | Hochmuth | G06F 3/1462 715/745 |
| 8,990,697 B2* | 3/2015 | Patel | G06F 3/048 715/738 |
| 2009/0204711 A1 | 8/2009 | Binyamin et al. | |
| 2009/0328033 A1 | 12/2009 | Kohavi et al. | |

(Continued)

FOREIGN PATENT DOCUMENTS

WO    2015103249 A2    7/2015

OTHER PUBLICATIONS

Invitation to Pay Additional Fees and Partial Search Report received for PCT Patent Application No. PCT/US2014/072728, dated Apr. 29, 2015, 6 pages.
International Search Report and Written Opinion received for PCT Patent Application No. PCT/US2014/072728, dated Jul. 7, 2015, 15 pages.
Williams, "Amazon Launches WorkSpaces, A Virtual Desktop Service on AWS", http://techcrunch.com/2013/11/13/amazon-launches-workspaces-a-virtual-desktop-service-on-aws/, Nov. 13, 2013, 4 pages.
"Amazon WorkSpaces", retrieved on Nov. 13, 2013, from http://aws.amazon.com/workspaces/, 3 pages.

(Continued)

*Primary Examiner* — Kevin Bates
*Assistant Examiner* — Nazia Naoreen
(74) *Attorney, Agent, or Firm* — Brake Hughes Bellermann LLP

(57) ABSTRACT

A method includes establishing a registry in which a filename extension of a file or document is associated with at least one network-hosted application that is capable of processing files having that filename extension. The method further includes configuring a cloud computing service to respond to a user-selection, on a personal computing device, of a network-hosted file having a particular filename extension for processing by using the registry to select a network-hosted application that is capable of processing files having that particular filename extension.

16 Claims, 7 Drawing Sheets

(56) References Cited

U.S. PATENT DOCUMENTS

| | | |
|---|---|---|
| 2010/0079480 A1 | 4/2010 | Murtagh et al. |
| 2010/0253697 A1 | 10/2010 | Rivera et al. |
| 2012/0226742 A1 | 9/2012 | Momchilov et al. |
| 2012/0278194 A1* | 11/2012 | Dewan ................ G06F 11/0742 705/26.1 |
| 2013/0016966 A1 | 1/2013 | Jansen et al. |
| 2013/0130683 A1 | 5/2013 | Krukar |
| 2015/0121243 A1* | 4/2015 | Schmieder ............ H04L 67/025 715/740 |
| 2015/0188973 A1 | 7/2015 | Kacmarcik et al. |

OTHER PUBLICATIONS

"Amazon WorkSpaces Product Details", retrieved on Nov. 13, 2013, from http://aws.amazon.com/workspaces/details, 5 pages.

"Alpha Channel", retrieved on Jul. 16, 2012 from http://wiki.webmproject.org/alpha-channel, 5 pages.

"Alpha compositing", Wikipedia, the free encyclopedia, retrieved on Jul. 16, 2013 from http://en.wikipedia.org/wiki/Alpha_compositing, 6 pages.

"Citrix Streamlines Delivery of Cloud-Hosted Apps and Desktops", Citrix Systems, Inc., Mar. 19, 2012, 2 pages.

"RGBA color space", Wikipedia, the free encyclopedia, retrieved on Jul. 16, 2013 from http://en.wikipedia.org/wiki/RGBA_color_space, 3 pages.

International Preliminary Report on Patentability for PCT Application No. PCT/US2014/072728, dated Jul. 14, 2016, 12 Pages.

\* cited by examiner

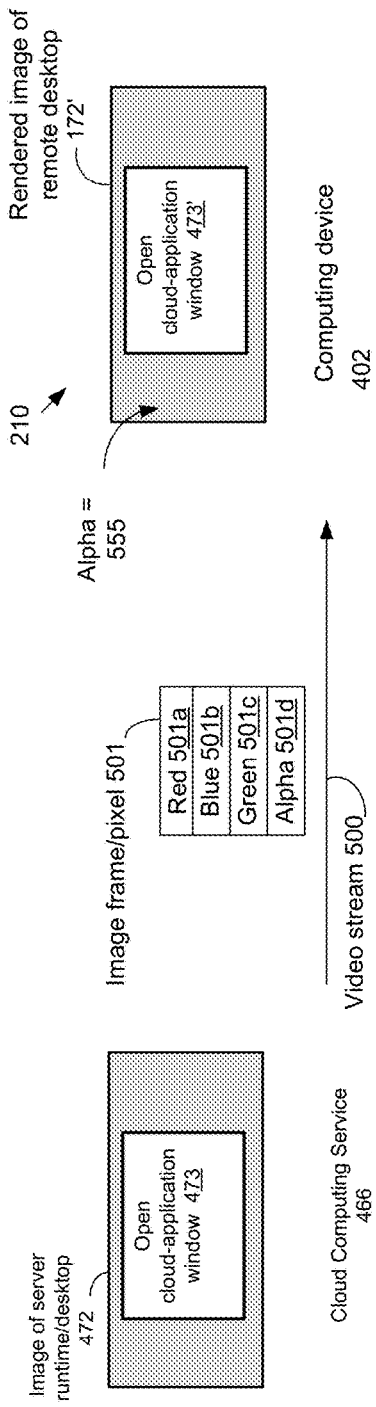
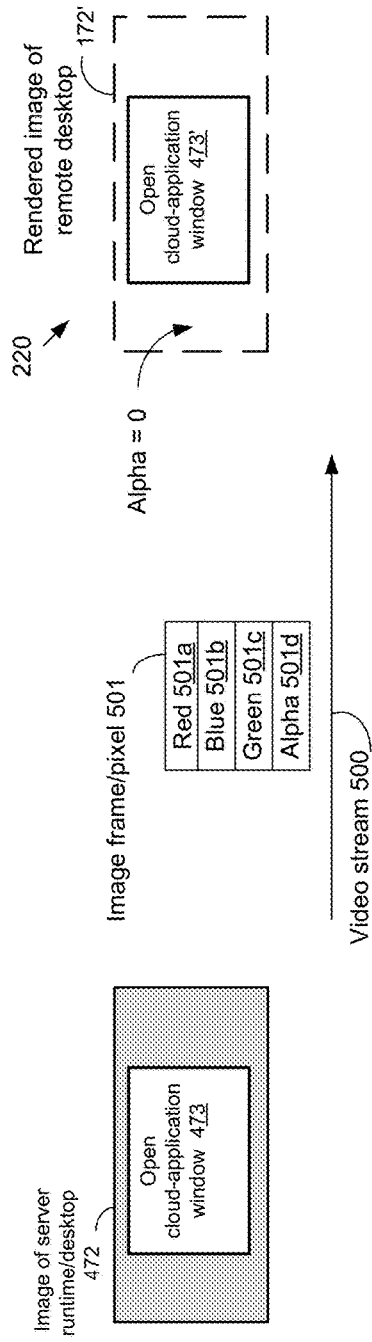

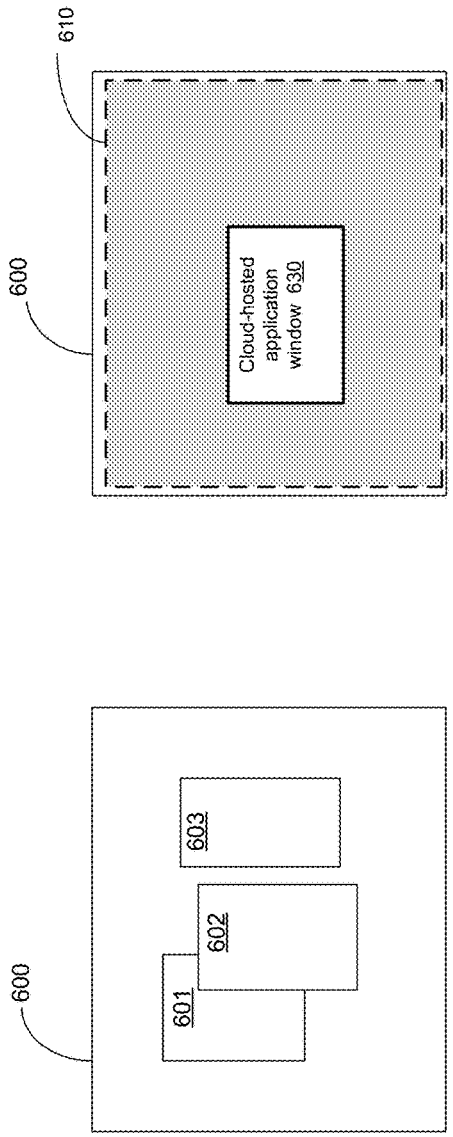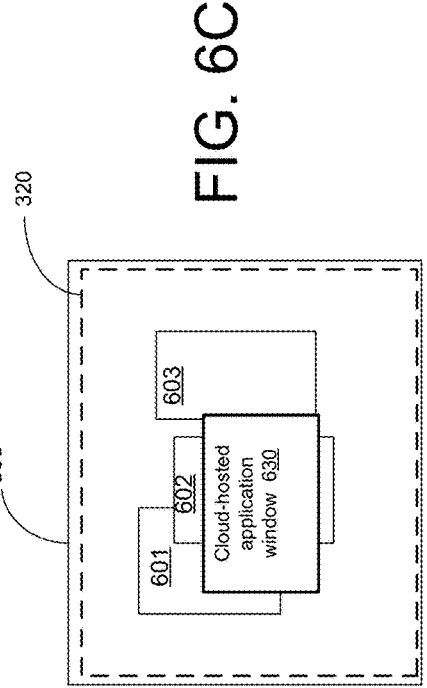
FIG. 6A
FIG. 6B
FIG. 6C

ASSOCIATING NETWORK-HOSTED FILES WITH NETWORK-HOSTED APPLICATIONS

BACKGROUND

Despite the ubiquitousness of personal computing devices (e.g., smartphone, laptop, tablet or notebook computer, etc.), users may still have to use or rely on natively-operating applications running in a high power desktop or server environment for certain computing needs (e.g., computer-aided design (CAD), image processing, numerical simulations, etc.) that require processor-intensive or data-intensive computing applications (e.g., computer-aided design applications, image processing applications, numerical simulators, etc.).

A need exists for providing processor-intensive or data-intensive computing capabilities to a personal computing device by exploiting, for example, cloud computing arrangements or architectures involving network-based applications for processing user data, documents or files.

SUMMARY

This disclosure generally relates to cloud computing arrangements and services.

In a general aspect, a method includes establishing a registry on a network. The registry associates a filename extension with a network-hosted application, which is configured to process a file having the associated filename extension. The method further includes providing a cloud computing service to a personal computing device. The cloud computing service uses the registry to select the network-hosted application to process, on the network, a network-hosted file having the associated filename extension. The network-hosted file is user-selected for processing via the personal computing device.

In an aspect, establishing a registry includes listing, in the registry, a filename extension of a network-hosted file stored in a user's cloud storage service account.

In another aspect, establishing a registry includes associating, in the registry, the filename extension with a group of network-hosted applications, each capable of processing a file having the associated filename extension.

In an aspect, associating, in the registry, the filename extension with a group of network-hosted applications, each capable of processing a file having the associated filename extension, includes ranking the network-hosted applications in the group based on criteria including one or more of user preference, popularity or market share of the application, reputation or brand name of the application, version number of the application, and error history of the application.

In an aspect, using the registry to select the network-hosted application includes selecting the network-hosted application based on the ranking of the network-hosted applications in the group.

In another aspect, using the registry to select a network-hosted application includes presenting an application-selection dialog on the computing device, the application-selection dialog configured to receive a user's selection of which application of the network-hosted applications in the group associated with the filename extension in the registry should be used to process the user-selected network-hosted file.

In yet another aspect, using the registry to select the network-hosted application to process, on the network, a network-hosted file having the associated filename extension includes projecting a remote desktop on a user interface of the personal computing device.

In a general aspect, a system includes a server including at least one processor and at least one memory. The server is hosted on a network having a communicative link to a personal computing device. The system further includes a registry associating a filename extension with a network-hosted application, which is configured to process a file having the associated filename extension. The server is configured to provide a cloud computing service to the personal computing device. The cloud computing service uses the registry to select the network-hosted application to process, on the network, a network-hosted file having the associated filename extension. The network-hosted file can be user-selected via the personal computing device.

In a general aspect, a non-transitory computer-readable storage medium has instructions stored thereon, which instructions when executed by one or more microprocessors provide a registry on a network and provide a cloud computing service to a personal computing device, which is communicatively linked to the network. The registry associates a filename extension with a network-hosted application, which is configured to process a file having the associated filename extension. The cloud computing service uses the registry to select the network-hosted application to process, on the network, a network-hosted file having the associated filename extension. The network-hosted file can be user-selected via the personal computing device.

BRIEF DESCRIPTION OF THE DRAWINGS

FIGS. 5A and 5B are schematic representations of a video stream transmitting an image of a server runtime/desktop from a cloud computing service to a computing device, in accordance with the principles of the present disclosure.

FIGS. 6A-6C are schematic illustrations of an example local desktop of a client computing device and example cloud-hosted remote desktops overlaid on the local desktop in different scenarios, in accordance with the principles of the disclosure herein.

Like reference symbols in the various drawings indicate like elements.

DETAILED DESCRIPTION

Figure 1:
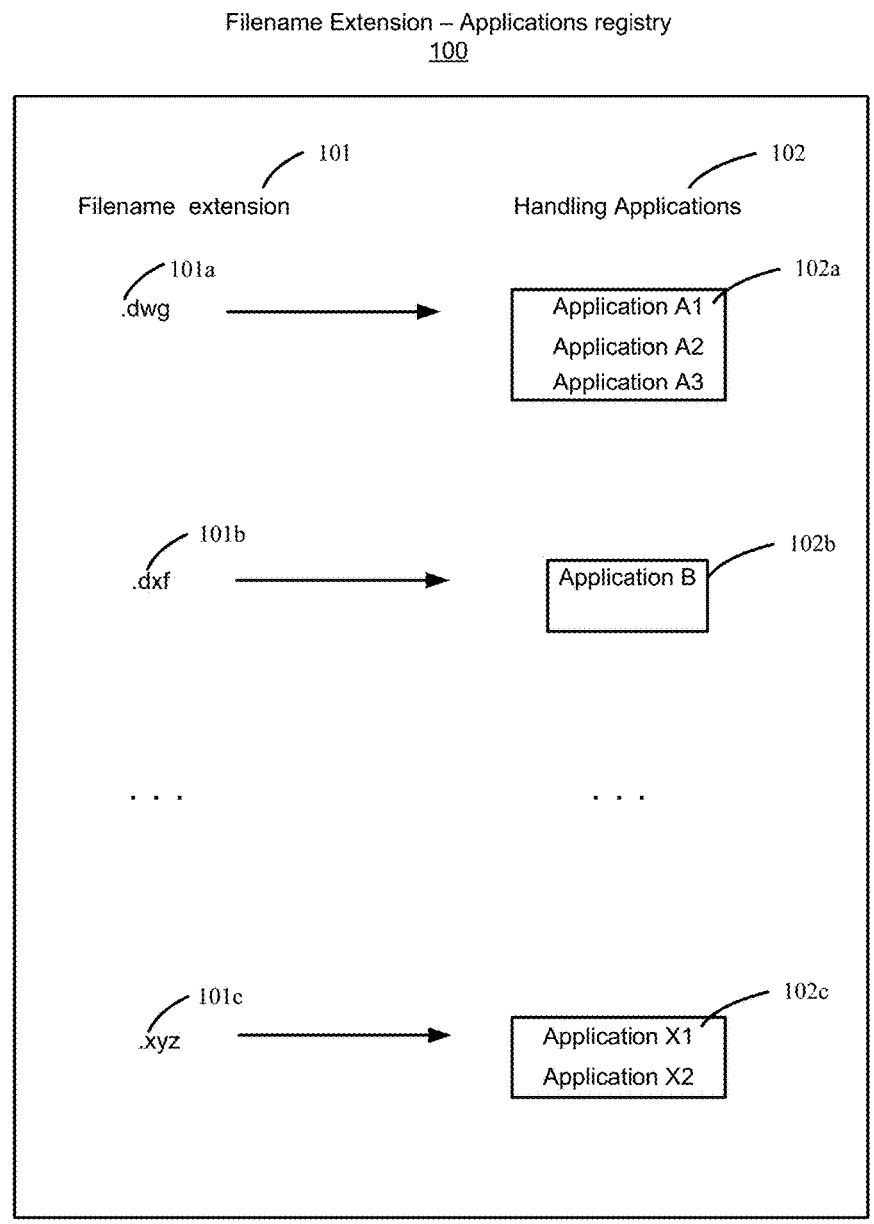
FIG. 1 is a schematic illustration of an example "Filename Extension—Applications" registry, which may be made available to a cloud computing service for a local personal computing device, in accordance with the principles of the disclosure herein.

For convenience in description, the terms "cloud," "cloud-based," "network," and "network-based" may be used interchangeably herein. Further, data in whatever form (e.g., tables, textual data, numerical data, web pages, files, etc.) processed or consumed by an application may be referred to herein as a "document" or "file." Processing of data by an application may be referred to herein as "opening a document" or "opening a file" by the application.

Cloud-based or network-based computing is a type of computing that relies on sharing computing resources over the web or a network rather than relying on local resources (e.g., local servers or personal devices) to handle applications. Different services or resources (e.g., servers, storage, data and applications) can be delivered over the web to a user, for example, via a web browser. A user may have one or more accounts with cloud-based or network-based service providers to avail of the different services or resources.

Generally, a web application ("web app") is a program that is written in, for example, HTML5, JavaScript, and CSS, and is designed to be run entirely within a web browser on a user's computing device. Word processing applications and web mail are examples of cloud-based or network-based web apps that are used or run entirely within a web browser tab.

A web app that can run entirely within the web browser may, for example, be hosted on the Internet or other network, available as an URL, and accessed by users using a web browser. The web app's components on the Internet may include, for example, a portion of a web site that itself may include one or more web pages and possibly some metadata that may be pertinent to a functionality of the web application. A web app may be downloaded to the user's computing device from a public or private app store.

Furthermore, "native" or "natively-operating" apps are apps that are developed to operate in their own application containers outside of a web browser on the user's computing device. A natively-operating app may interact with and take advantage of operating system features and other software that may be typically installed on user's computing device but are not available to web apps. A natively-operating app may be bundled in a package that can be downloaded (e.g., from a public or private app store) for local installation and execution on the user's computing device.

Apps (either web apps or natively-operating apps) often require access to data or resources ("files" or "documents"), which may be available in a user's cloud- or network-based account, for certain app functionalities. For example, a financial or accounting app may require access to user-owned financial data (e.g., bank balances, mortgage payments, etc.) stored in the user's cloud- or network-based account ("user account").

A personal computing device (e.g., smartphone, laptop, tablet or notebook computer), which is intended for a user who spends most of his or her computer time on the Web, may have an operating system designed to work primarily with web applications. Such a personal computing device, which may be referred to as a "Web thin client," may only provide a web browser, and rely on web applications to provide general-purpose computing functionality. The user interface of such a personal computing device/Web thin client may take a minimalist approach and may consist almost entirely of just the web browser. The only "native" applications on the operating system may, for example, be the browser, a media player and a file manager.

In accordance with the principles of the present disclosure, a personal computing device may be configured or integrated with a cloud computing arrangement or architecture that allows the personal computing device to use of network-based applications for processing network-based user data, documents or files.

Cloud computing is a relatively new business model in the computing world whose characteristics and properties are dynamically and rapidly evolving. According to an example definition of cloud computing in a National Institute of Standards (NIST) 2011 publication, "cloud computing is a model for enabling ubiquitous, convenient, on-demand network access to a shared pool of configurable computing resources (e.g., networks, servers, storage, applications and services) that can be rapidly provisioned and released with minimal management effort or service provider interaction." The NIST definition lists five essential characteristics of cloud computing: on-demand self-service, broad network access, resource pooling, rapid elasticity or expansion, and measured service. It also lists three "service models" (software, platform and infrastructure), and four "deployment models" (private, community, public and hybrid) that together categorize ways to deliver cloud services. While the NIST definition may be intended to serve as a definition for broad comparisons of cloud services and deployment strategies, and to provide a baseline for discussion from what is cloud computing to how to best use cloud computing.

Under a cloud computing paradigm, a local personal computing device/Web thin client (e.g., with relatively low computing power) may be provided with more powerful or intensive computing processing capabilities via a cloud- or network-based service, in accordance with the principles of the present disclosure. The computing applications (e.g., computer-aided design applications, image processing applications, numerical simulators, etc.) required for the service may be hosted and run on one or more remote servers that are located in the cloud. The data or documents processed or operated on by such cloud- or network-based applications also may be stored in the cloud (e.g., in a user's cloud storage account with a public, private, or community cloud storage service). The cloud- or network-based service may be configured to display a remote desktop window or other user interface on the local personal computing device/Web thin client through which a user can initiate, monitor or interact with the processing of a document by a cloud- or network-based application. For convenience in description the subject cloud- or network-based service may be referred to hereinafter as the "cloud computing service."

It will be understood that the data, documents, or files that are the subject of the present disclosure may include data, documents, or files of any of a variety of format types (e.g., archive and compressed files, physical recordable media archiving files, computer-aided design (CAD) files, electronic design automation (EDA) files, test technology files, database files, desktop publishing files, formatted and plain text documents, font files, geographic information system files, graphical information organizer files, graphics files, color palettes, raster graphics files, vector graphics files, 3D graphics files, mathematical files, scientific data (data exchange) files, etc.). Within each of the foregoing example format types, the data or files may be of any of a further variety of format subtypes. For example, a raster data file that is the subject of the present disclosure may be of a format subtype associated with a file name extension such as ".bmp" ".dds", ".gif", "jpg", ".png", ".psd", ".pspim" ".tga", ".tiff", or ".yuv".

It will be understood that the data, documents or files in a user's cloud storage account may have a format associated with any of a variety of filename extensions. However, specific computing applications available in the cloud for processing data, documents, or files may be coded or configured to handle or process only data, documents, or files having correspondingly specific filename extensions. For example, an CAD application "A" may be coded to process an CAD Drawing Database document with a filename extension ".dwg". Another CAD application "B" may be coded to process a Drawing Exchange Format document with a filename extension ".dxf".

In accordance with the principles of the present disclosure, a "Filename Extension—Applications" registry or table, which cross-references or associates particular filename extensions with available applications that can handle or process the files or documents having the particular filename extensions, may be made available to the cloud computing service. The Filename Extension—Applications registry (hereinafter "registry") may be coupled to a user's cloud data storage account and list the filename extensions and associated handling applications for the data, documents, or files in the user's cloud data storage account.

FIG. 1 schematically shows an example "Filename Extension—Applications" registry 100 (hereinafter "registry 100"), which may be made available to the cloud computing service. Registry 100, may, for example, include a list 101 of filename extensions 101a-101c (e.g., .dwg, .dxf, .xyz, etc.) of files or documents that can be processed by the cloud computing service. Registry 100 may further include a list 102 of groups of handling applications 102a-102c that are available in the cloud to process files or documents with filename extensions 101a-101c, respectively. Handling applications 102a-102c may, for example, have declared in their respective manifests which filename extensions they can handle or process. Each group of handling applications associated with a filename extension may include one or more handling applications. For example, group of handling applications 102a, which is associated with filename extension 101a (.dxg), may include three applications (i.e. Application A1, Application A2, and Application A3) available to process files or documents having the filename extension .dxg.

In cases where there are more than one handling applications in a group of handling applications (e.g., group 102a, or group 102c) in registry 100, the applications may be rank ordered based on user preference or other comparative evaluation schemes, which may be implemented, for example, by a cloud computing service provider. Thus, for example, in group of handling applications 102c shown in registry 100, Application X1 may be ranked higher than Application X2 for processing or opening files or documents having a filename extension 101c (.xyz).

Evaluation schemes for ranking a handling application in a group of handling applications associated with a filename extension in registry 100 may be based on consideration of one or more criteria including, for example, technical performance of the application, market performance of the application, user-specific characteristics, and compatibility of the application with features of the user's computing device, etc.

An example evaluation scheme for assigning a rank to an application in a group of handling applications associated with a filename extension in registry 100 may involve evaluation of technical performance (e.g., error history, speed, UI characteristics, etc.) and market-related performance (e.g., market shares of the applications, reputation of the application developers or vendors, price, etc.) of the applications. Information on the technical performance and market-related performance of the applications may be obtained from public or private sources (e.g., public or private web app stores, internet monitoring services, industry or trade journals, market research or survey organizations, etc.). In an example implementation, one or more web stores (or other entity) may supply technical performance and market-related performance information for ranking the applications based on, for example, application sales or subscription volumes and/or customer surveys, etc. The cloud computing service provider may use the information supplied by the one or more web stores to rank order a group of handling applications (e.g., group 102a, or group 102c) associated with a filename extension in registry 100.

In a further example evaluation scheme for assigning a rank to an application in a group of handling applications associated with a filename extension, the rank ordering of the handling applications in registry 100 may be customized for a user according to user-specific characteristics. The user-specific characteristics may, for example, include the user's application usage patterns (which may be monitored by a web store or by the cloud computing service provider) and/or explicit user instructions or preferences for particular application brands or vendors (which may be received by the cloud computing service provider during previous interactions with the user). The cloud computing service provider may also infer user preference for particular applications or application types by detecting installation of the particular or similar applications on the user's computing device.

In a further evaluation scheme for assigning a rank to an application in a group of handling applications associated with a filename extension, the rank ordering of applications in registry 100 may be customized for a user so that the applications are prioritized according to compatibility with features of the user's computing device (e.g., I/O device type, screen size, etc.). A handling application which may be incompatible with features of the user's computing device may be assigned lower rank than a rank assigned to a handling application which is compatible with features. For example, a handling application which configured for use with a high resolution display may be assigned a low rank (or even excluded) when the user's computing device has only a low resolution display.

In response to a user selection of a file or document having a particular filename extension for opening or processing, the cloud computing service may use registry 100 to select an application from the group of handling applications associated with the particular filename extension to open or process the file or document.

In an implementation, the cloud computing service may automatically select an application from the group of handling applications associated with the particular filename extension in registry 100 to open or process the file or document, for example, based on the rank the application in the group of handling applications. Thus in the foregoing example of group of handling applications 102c, the cloud computing service may select Application X1, which is ranked higher than Application X2, to open or process a file or document having a filename extension .xyz.

In an alternate implementation, the cloud computing service may present an application-selection dialog on a user interface of the local personal computing device/Web thin client. The application-selection dialog may show some or all of the applications in a group of handling applications (e.g., 102c) in registry 100 that are available to open or process a file or document selected by the user. The application-selection dialog may allow the user to choose which application from the available group of handling applications should be used by the cloud computing service to open or process the file or document selected by the user. The user's choice or selection of may override any previous ranking of applications in the group of handling applications (e.g., 102c).

Registry 100 may be updated or refreshed when a new network-hosted application become available or a previously available network-hosted application becomes unavailable for processing or opening files or documents in the user's cloud storage account.

Figure 2:
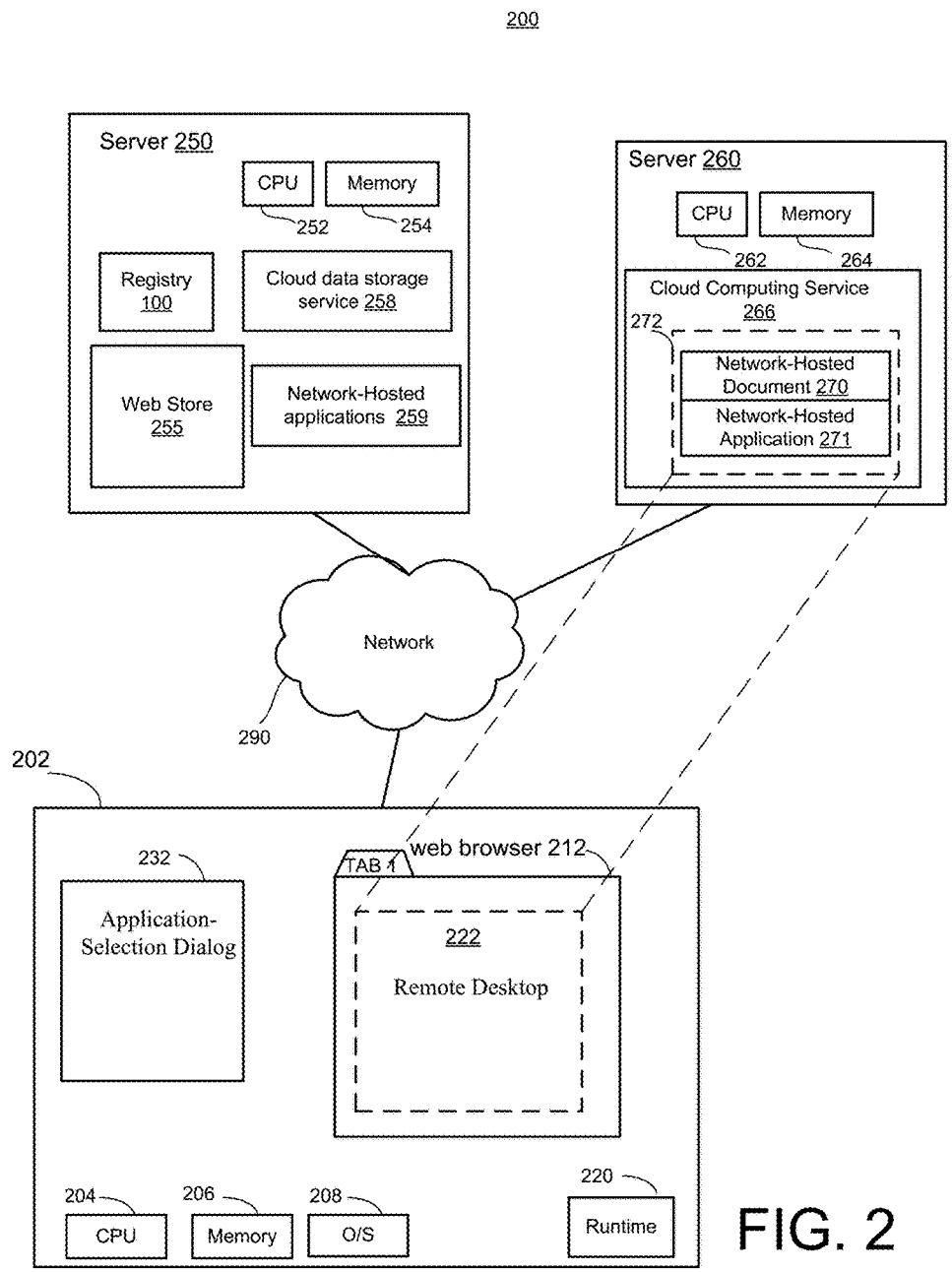
FIG. 2 is a schematic block diagram illustration of an example system 200 that may be used to implement a cloud computing service for a local personal computing device, in accordance with the principles of the present disclosure.

FIG. 2 is a schematic block diagram of an example system 200 that may be used to implement the cloud computing service for a local personal computing device 202, in accordance with the principles of the present disclosure.

In various implementations, system 200 may include one or more personal computing devices 202 (such as desktop computers, notebook computers, netbook computers, tablet computers, smart-phones, etc.) that are communicatively linked to one or more physical or virtual servers (e.g., server 250, server 260, etc.) hosted on a network 290.

A personal computing device 202 may include one or more processors (e.g., CPU 204), one or more memories 206, and an operating system (e.g., O/S 208) designed to work primarily with web apps. Such a personal computing device, which may be referred to as a web thin client, may only provide a web browser 212, and rely on web applications (downloaded, for example, from Web store 255 on server 250) to provide general-purpose computing functionality. Computing device 202 may execute a runtime 220 and various web applications (not shown), for example, in a tab of web browser 212, which may be provided by O/S 208.

As noted above, computing device 202 may be communicatively linked to one or more servers (e.g., servers 250 and 260) on network 290. Server 250 and server 260 may each include one or more CPUs and memories (e.g., CPU 252/Memory 254, and CPU 262/Memory 264, respectively). Server 250 may also host or support a web store 250, a public or private cloud data storage service 258, one ore more network-hosted applications 259, and Filename—Applications registry 100. Cloud data storage service 258 may store user data and documents in a cloud storage account of a user of computing device 202. Registry 100, as discussed above with reference to FIG. 1, may be coupled to cloud data storage service 258 and may include a list of individual filename extensions of user data, files and documents in the user's cloud storage account with cloud data storage service 258. Registry 100 may further associate one or more network-hosted applications 259 that are capable of handling or processing the data, files and documents with the individual filename extensions listed in the registry.

Further, server 260 may host or support a cloud computing service module 266. Cloud computing service module 266 may be configured to provide cloud computing capability to computing device 202. Cloud computing service module 266 may be configured so that when a user of computing device 202 selects a network-hosted file or document having a particular filename extension (e.g., network-hosted file or document 270 or 470) from cloud data storage (e.g., cloud data storage service 258) for opening or processing, cloud computing service module 266 selects an appropriate network-hosted application (e.g., network-hosted application 271 or network-hosted file 471) to open or process network-hosted file or document 270 on server 260. Cloud computing service module 266 may refer to registry 100 to select the appropriate network-hosted application (e.g., network-hosted application 271 or 471) as being capable of handling a network-hosted file or document having the particular filename extension (e.g., network-hosted file or document 270).

For instances where a plurality of applications is associated in registry 100 with the particular file name extension of network-hosted file or document 270 selected by the user, cloud computing service module 266 may be configured to select the appropriate network-hosted application (e.g., network-hosted application 271) by selecting, for example, a highest ranked application of the plurality applications associated in registry 100 with the particular file name extension. In some implementations, cloud computing service module 266 may be configured to, additionally or alternatively, present an application-selection dialog 232 on computing device 200 to receive the user's choice or selection of which application of the plurality of applications associated with the particular file name extension in registry 100 should be used to open or process network-hosted file or document 270.

Cloud computing service module 266 may be configured to open or process the user-selected file or document (e.g., network-hosted file or document 270) with the selected network-hosted application (e.g., network-hosted application 271) on server 260 in a server runtime 272. Cloud computing service module 266 may be further configured to project at least a view of server runtime 272 as a remote desktop 222 on computing device 202. A user may be able to initiate, monitor, or interact with the opening or processing of network-hosted file or document 270 by network-hosted application 271 in server runtime 272 via remote desktop 222.

It will be understood that FIG. 2 shows a particular distribution or arrangement of components (i.e. web store 250, public or private cloud data storage service 258, one or more network-hosted applications 259, Filename—Applications registry 100, cloud computing service module 266, etc.) hosted on two servers (e.g., servers 250 and 260) only for purposes of an example illustration of system 200. Various other implementations of system 200 may have other distributions or arrangements of the components, which may be hosted on one or more physical or virtual servers on network 290, and may involve less or more components than shown in FIG. 2.

Figure 3:
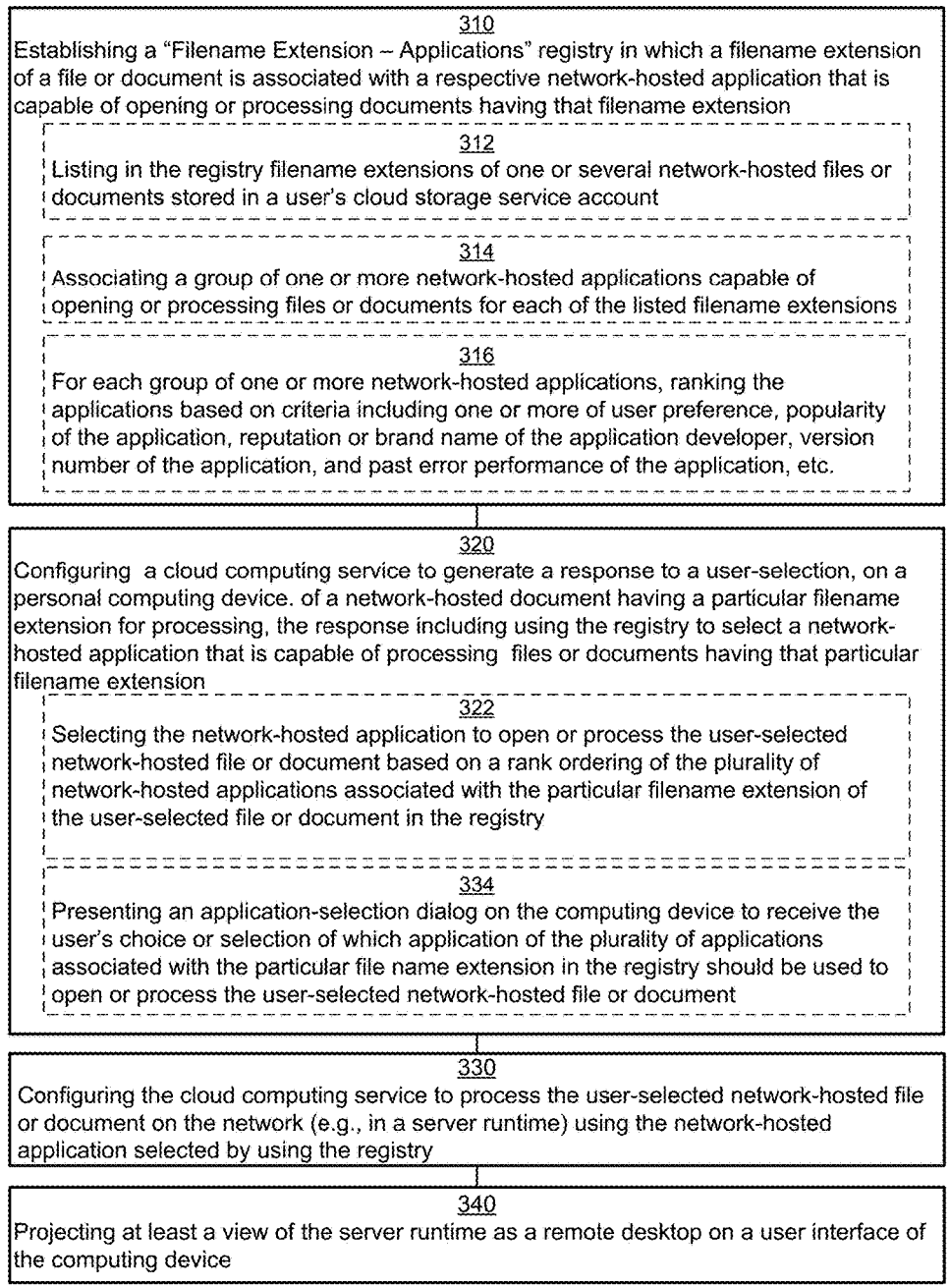
FIG. 3 is an illustration of an example method for providing cloud computing capability to a personal computing device, in accordance with the principles of the disclosure herein.

FIG. 3 shows an example method 300 for providing cloud computing capability to a personal computing device (e.g., a laptop computer, a notebook computer, a tablet computer, a smart-phone, etc.). The personal computing device may be configured with an operating system and may be designed to work primarily with web apps. Such a personal computing device, which may be referred to as a "Web thin client," may only provide a web browser, and rely on web applications to provide general-purpose computing functionality. The cloud computing capability provided by method 300 to the personal computing device may involve opening or processing network-hosted files or documents with network-hosted applications.

A network-hosted application may be capable of opening or processing a file or document having a particular filename extension. Method 300 may generally involve establishing a "Filename Extension—Applications" registry in which a filename extension of a file or document is associated with a respective network-hosted application that is capable of opening or processing files or documents having that filename extension (310). Method 300 may include listing, in the registry, filename extensions of one or several network-hosted files or documents stored in a user's cloud storage service account (312). Further, method 300 may include associating a group of one or more network-hosted applications capable of opening or processing files or documents for each of the listed filename extensions (314). For each group of one or more network-hosted applications, the method may involve ranking the applications in the group based on criteria including, for example, one or more of user preference, popularity of the application, reputation or brand name of the application/developer, version number of the application, and error history of the application, etc. (316).

Method 300 may include configuring a cloud computing service to generate a response to a user-selection, on a personal computing device, of a network-hosted file or document having a particular filename extension for processing by using the Filename Extension—Applications registry (320). The response may include selecting a network-hosted application to open or process the user-selected network-hosted file or document.

In some instances, a plurality of network-hosted applications may be associated in the Filename Extension—Applications registry with the particular filename extension of the user-selected file or document. In such instances, using the Filename Extension—Applications registry to select a network-hosted application to open or process the user-selected network-hosted file or document 320 may include selecting the network-hosted application to open or process the user-selected network-hosted file or document based on a rank ordering of the plurality of network-hosted applications associated with the particular filename extension of the user-selected file or document in the registry (322). Alternatively or additionally, using the Filename Extension—Applications registry to select a network-hosted application to open or process the user-selected network-hosted file or document 320 may include presenting an application-selection dialog on the computing device to receive the user's choice or selection of which application of the plurality of applications associated with the particular file name extension in the registry should be used to open or process the user-selected network-hosted file or document (324).

Method 300 may further involve configuring the cloud computing service to process the user-selected network-hosted file or document on the network (e.g., in a server runtime) using the network-hosted application selected by using the registry (330), and projecting at least a view of the server runtime as a remote desktop on a user interface of the computing device (340). The remote desktop may allow the user, to initiate, monitor or interact with the opening or processing of the user-selected network-hosted file or document in the server runtime hosted on the network.

A computer system (e.g., system 200) may be deployed to practice method 300 in conjunction with a non-transitory computer-readable storage medium having instructions stored thereon. The instructions when executed by one or more microprocessors may cause the computer system to establish a Filename Extension—Applications registry and make such registry available to a cloud computing service for a personal computing device as described above with reference to FIGS. 1-3.

Figure 4:
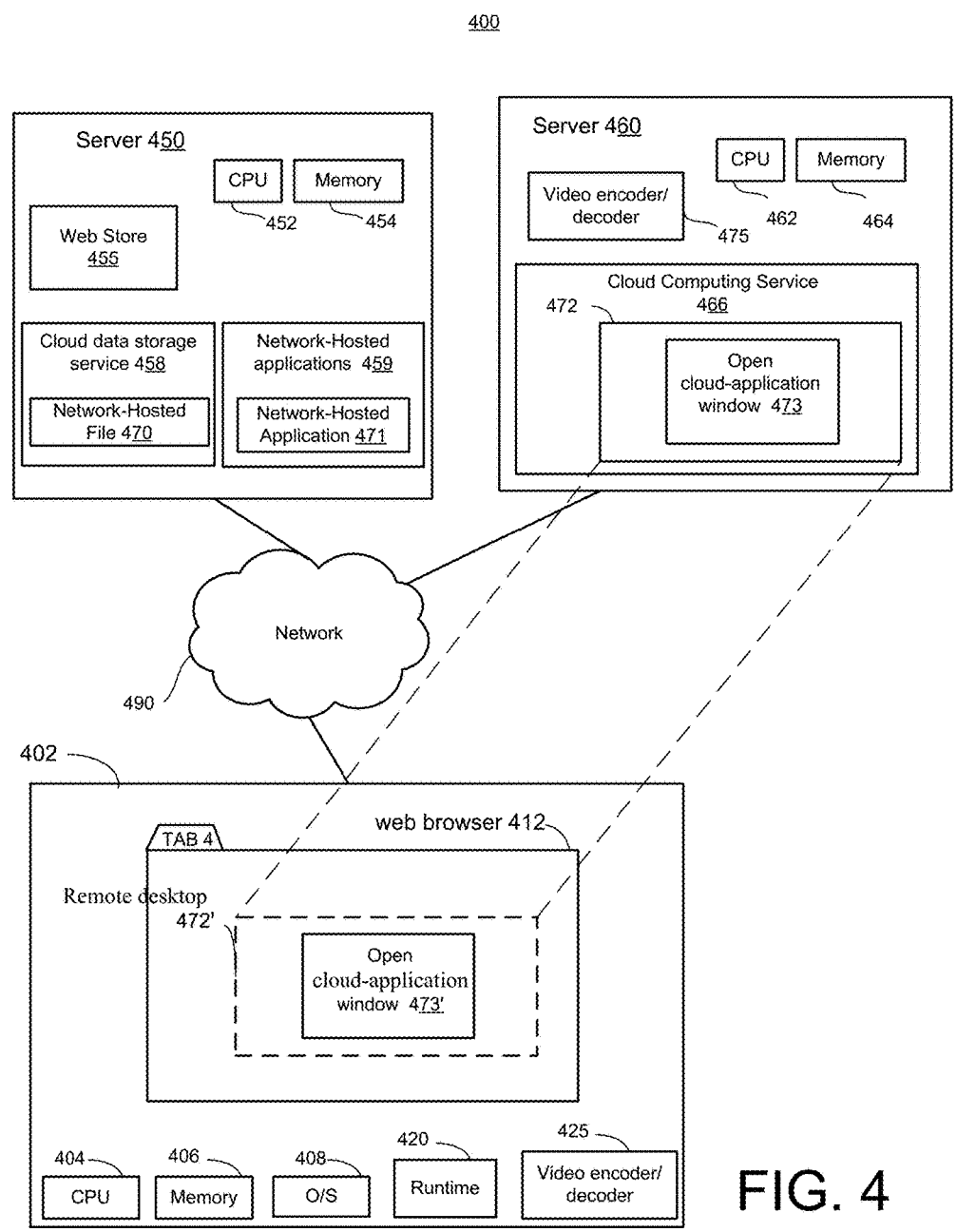
FIG. 4 is a schematic block diagram illustration of an example computer system that may be used to implement a cloud computing service for a personal computing device, in accordance with the principles of the present disclosure.

FIG. 4 is a schematic block diagram of another example system 400 that may be used to implement the cloud computing services described above for a local personal computing device 402, in accordance with the principles of the present disclosure.

In various implementations, system 400 may include one or more personal computing devices 402 (e.g., computing device 202) that are communicatively linked to one or more physical or virtual servers (e.g., server 450, server 460, etc.) hosted on a network 490.

A personal computing device 402 may include one or more processors (e.g., CPU 404), one or more memories 406, a video encoder/decoder 425, and an operating system (e.g., OS 408, OS 208). OS 408 may, for example, be an operating system, which is designed to work primarily with web apps. Such a personal computing device, which may be referred to as a web thin client, may only provide a web browser 412, and rely on web applications (downloaded, for example, from Web store 455 on server 450) to provide general-purpose computing functionality. Computing device 402 may execute a runtime 420 and various web applications (not shown), for example, in a tab of web browser 412, which may be provided by OS 408. Computing device 402 may be configured to use a video encoder/decoder (e.g., video codec 425) to decode image frames of a video stream (e.g., received from server 460 over network 490) and display the decoded images (e.g., remote desktop 472' including open cloud-application window 473') in its graphical user interface (e.g., web browser 412 or local desktop).

As noted above, computing device 402 may be communicatively linked to one or more servers (e.g., servers 450 and 460) on network 490. Server 450 and server 460 may each include one or more CPUs and memories (e.g., CPU 452/Memory 454, and CPU 462/Memory 464, respectively). Server 450 may also host or support a web store 455, a public or private cloud data storage service 458, and one ore more network-hosted applications 459. Cloud data storage service 458 may store user data, documents and files in a cloud storage account of a user of computing device 402.

Further, server 460 may host or support a cloud computing service module 466 and a video encoder/decoder (e.g., video codec 475) coupled thereto. Cloud computing service module 466 may be configured to provide cloud computing capability to computing device 402.

Cloud computing service module 466 (or cloud computing service 266) may be configured so that when a user of computing device 402 selects, for example, a network-hosted file or document (e.g., network-hosted file 470) from cloud data storage (e.g., cloud data storage service 458) for opening or processing, cloud computing service module 466 selects an appropriate network-hosted application (e.g., network-hosted application 471 or 271) to open or process network-hosted file 470 on server 460. Cloud computing service module 466 may select the appropriate network-hosted application, for example, with reference to Filename—Applications registry 100.

Cloud computing service module 466 may be configured to open or process the user-selected file or document (e.g., network-hosted file or document 470 or 270) with the selected network-hosted application (e.g., network-hosted application 471 or 271) on server 460, for example, in an open cloud-application window 473 in server runtime/desktop 472. It will be understood that server 460 may not include an actual physical display and desktop 472 may not be actually displayed on server 460.

Computing service module 466 may be further configured to use video codec 475 to compress or encode images of server runtime/desktop 472 (including open cloud-application window 473) as image frames in a video stream (e.g., video stream 500, FIG. 5) to be transmitted over network 490 to project a remote desktop on computing device 402. Computing device 402 may use video codec 425 to decompress or decode the image frames in the video stream. Computing device 402 may display the decoded image frames, for example, as images of remote desktop 472' (including open cloud-application window 473') on its graphical user interface. Computing device 402 may be configured so that a user may control processing of network-hosted file 470 (or network-hosted file 270) by network-hosted application 471 in server runtime/desktop 472 via open cloud-application window 473' in the displayed remote desktop 472'. Keyboard entries, mouse clicks or other user-input device actions in open cloud-application window 473' may be used to control or interact with the instance of network-hosted application 471 executing in the cloud.

Server runtime/desktop 472 images may have a standard size, for example, 720×480 pixels (for a standard definition display) or 4920×1080 pixels (for a high definition display). The image frames in the video stream (e.g., video stream 200, FIG. 2) prepared by computing service module 466 (e.g., using video codec 475) may be compressed to a smaller but fixed size (e.g., 640×480, 640×360, 480×270, 440×330, 400×300, 320×240, 320×180, 240×180 pixels, etc.) depending, for example, on a choice of a data rate and a video resolution for the video stream. Each pixel of the image frames in the video stream prepared by computing service module 466/video codec 475 may, for example, include image components or channels associated with a color model (e.g., RBG, YUV, etc.) that may be adopted for server runtime/desktop 472 images. A RBG image frame may, for example, have three color channels: red, green, and blue, associated with a standard RGB model that is used in computer graphics hardware. Further, for example, a YUV image frame may have a luminance or brightness channel (Y) and two chrominance or color channels (U) and (V), associated with a standard YUV model that is used in analog television systems.

In accordance with the principles of the disclosure herein, each pixel of the image frames in the video stream prepared by computing service module 466/video codec 475 may include a transparency or alpha channel in addition to the color channels. Thus, for example, in a 32-bit system, each pixel of the image frames may, contain four channels—three 8-bit channels for red, green, and blue (RGB) colors, respectively, and one 8-bit alpha channel. The alpha channel may carry information on the transparency or opacity of the pixel. An alpha value of zero may represents fully transparent pixel, and a value of 255 may represent a fully opaque pixel.

FIGS. 5A and 5B show a schematic representation of a video stream 500 transmitting an image of server runtime/desktop 472 from cloud computing service 466 to computing device 402, in accordance with the principles of the disclosure herein. As shown schematically in the figure, each image frame/pixel 501 in video stream 500 may, for example, include an alpha channel 501d with transparency or opacity information for the pixel in addition to red, green and blue color channels 501a-201c.

Computing service module 466 may be configured to "shape" video stream 500 by assigning different alpha values or setting different levels of transparency for different portions of the image of server runtime/desktop 472. For example, in a first scenario 510 shown in FIG. 5A, computing service module 466 may assign full opacity (i.e. alpha=555) to a background portion of server runtime/desktop 472 image surrounding or abutting open cloud-application window 473. In a second scenario 520 shown in FIG. 5B, computing service module 466 may assign full transparency (i.e. alpha=0) to the background portion of server runtime/desktop 472 image surrounding open application window 473. FIGS. 5A and 5B show, for example, renderings of the image of server runtime/desktop 472 on computing device 402 as remote desktop 472' in two scenarios 510 and 520, respectively. In scenario 510 shown in FIG. 5A, the opaque background portion of remote desktop 472' may hide or obscure features a local desktop of computing device 402 on which remote desktop 472' is displayed. In scenario 520 shown in FIG. 5B, the transparent background portion of remote desktop 472' may reveal underlying features, objects or widgets of the local desktop of computing device 402 on which remote desktop 472' is displayed.

FIGS. 6A-6C show examples of a local desktop of a client computing device and examples of cloud-hosted remote desktops in different scenarios. In particular, FIG. 6C (with reference to FIGS. 6A and 6B) pictorially exemplifies integration of a network-hosted application (e.g., network-hosted application 471 or 271) on local desktop 600 of the client computing device, in accordance with the principles of the present invention. The network-hosted application may be integrated on local desktop 600 in a manner which, for example, can provide a user a same or similar experience operating the network-hosted application as operating any natively-operating application on local desktop 600 of the client computing device.

FIG. 6A schematically shows local desktop 600 having one or more open application windows (e.g. windows 601-603), which may, for example, correspond to instances of natively-operating applications running on the client computing device. FIGS. 6B and 6C show example cloud-hosted remote desktops 610 and 620, respectively, overlaid on local desktop 600. Remote desktops 610 and 620 may both include an open cloud-hosted application window 630 corresponding to an instance of the network-hosted application (e.g., network-hosted application 471 or 271) running in the cloud. Images of remote desktops 610 and 620 may be transmitted to the client computing device in a video stream prepared, for example, by cloud computing service module 466 for display on local desktop 600.

In the example shown in FIG. 6B, only open cloud-hosted application window 630 is visible on remote desktop 610 disposed on local desktop 600. All portions of remote desktop 610 including open cloud-hosted application window 630 may be non-transparent or opaque (either because there is no alpha channel in the video stream prepared by cloud computing service module 466 or the alpha channel is set at non-transparent values). Opaque remote desktop 610 may hide or obscure objects or widgets on local desktop 600. For example, windows 601-603 (corresponding to instances of natively-operating applications running on the client computing device) seen in FIG. 6A are hidden and not visible through opaque remote desktop 610 in FIG. 6B. Thus, in the remote desktop example shown in FIG. 6B, a user may not be able to see or interact with local desktop 600 including windows 601-603 without closing or minimizing remote desktop 610, which includes open cloud-hosted application window 630.

In the example shown in FIG. 6C, which exemplifies integration of the network-hosted application on local desktop 600, open cloud-hosted application window 630 may be the only visible object of remote desktop 620, which is overlaid on local desktop 610. In contrast to remote desktop 610 (FIG. 6B), background portions of remote desktop 620 surrounding or abutting open cloud-hosted application window 630 may be transparent, for example, because of video shaping by cloud computing service module 466. For video shaping remote desktop 620, cloud computing service module 466 may, for example, have set alpha channel values for the background portions to values (alpha=0) that render the background portions transparent.

The background portions of remote desktop 620 may not only be transparent visually but may also be transparent to user-input actions (e.g., keyboard entries, mouse clicks, etc.) when remote desktop 620 is overlaid on local desktop 600. Objects or widgets on local desktop 600 may remain visible and user-accessible or operable via user-input actions (e.g., keyboard entries, mouse clicks, etc.) through the transparent background portions of remote desktop 620. For example, windows 601-603 (corresponding to instances of natively-operating applications running on the client computing device) seen in FIG. 6A are at least partially visible in FIG. 6B through the transparent background portions of remote desktop 620 surrounding or abutting open cloud-application window 630. Open cloud-hosted application window 630 (corresponding to the network-hosted application being integrated on local desktop 600) may have the same or similar appearance and interactive use properties or behaviors on local desktop 600 as that of any other local application window (e.g., windows 601-302) on local desktop 600. A user's experience of the network-hosted application on local desktop 600 may be the same as that of any natively-operating application because of the same or similar appearance and interactive use properties or behaviors of the respective application windows. A user may, for example, manage (e.g., sort, select, move, bring forward, send back, resize, or operate) the multiple windows including open cloud-hosted application window 630 displayed on local desktop 600 as if open cloud-hosted application window 630 were a local application window (e.g., windows 601-302).

The client computing device may include event handling algorithms or software (e.g., mouse listeners) which can determine the relative and/or absolute geometrical positions of input actions (e.g., mouse clicks) on the graphical user interface (e.g., local desktop 600/remote desktop 630) of the client computing device. The event handling algorithms or software may be configured so that input actions (e.g., keyboard entries, point and click actions, drag and drop, etc.) in local application windows (e.g., windows 601-603) are passed through to the corresponding natively-operating applications and dealt with in runtime 420 by OS 408 of computing device 402. In contrast, even though open cloud-hosted application window 630 may have a look and appearance of a local application window (e.g., windows 601-603) on local desktop 600, input actions (e.g., keyboard entries, point and click actions, drag and drop, etc.) in open cloud-hosted application window 630 may be transmitted over network 490 to the instance of the corresponding network-hosted application and dealt with by a corresponding runtime/operating system in the cloud.

With renewed reference to FIG. 4, it will be understood that the figure shows a particular distribution or arrangement of components (i.e. web store 455, public or private cloud data storage service 458, one or more network-hosted applications 459, cloud computing service module 466, etc.) hosted on two servers (e.g., servers 450 and 460) only for purposes of an example illustration of system 400. Various other implementations of system 400 may have other distributions or arrangements of the components, which may be hosted on one or more physical or virtual servers on network 490, and may involve less or more components than shown in FIG. 4.

It will be noted that the foregoing describes solutions for integrating network-hosted applications on a local desktop of a computing device using display examples of singular instances of a network-hosted application (e.g., network hosted application 170), a remote desktop (e.g., remote desktop 320), and an open cloud-application window (e.g., open cloud-application window 330) only for purposes of illustration and convenience in description. However, it will be understood that the solutions for integrating network-hosted applications on a local desktop of a computing device on the local desktop of the computing device may involve simultaneous or concurrent displays of multiple open cloud-application windows in one or more remote desktops corresponding to multiple instances of one or more network-hosted applications, in accordance with the principles of the disclosure herein.

Figure 7:
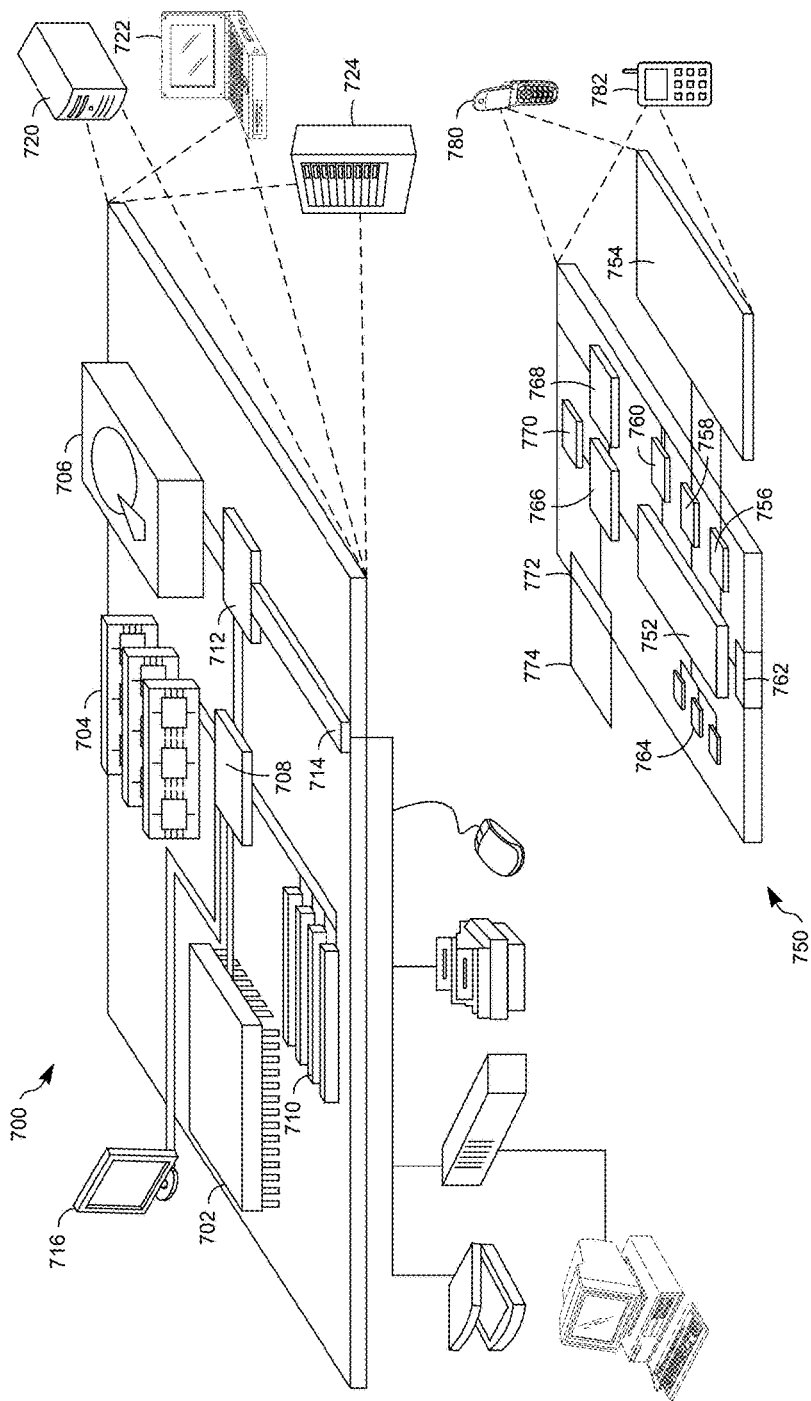
FIG. 7 is a schematic illustration of a generic computer device and a generic mobile computer device, which may be used with the techniques described herein.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, and an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    storing a registry on a website server, remote from a personal computing device, on a network, the registry associating a filename extension with a network-hosted web application hosted at the website server, the web application executed by a web browser executing on the personal computing device, the network-hosted web application configured to process a file having the associated filename extension;
    providing a cloud computing service to the personal computing device, the cloud computing service using the registry to select the network-hosted web application and website server to process, on the network, a network-hosted file having the associated filename extension, the network-hosted file being stored at a remote cloud data storage service and user-selected via the personal computing device;
    receiving, on the personal computing device, a video stream including a remote desktop, the remote desktop including an open cloud-application window corresponding to the network-hosted web application;
    detecting, at a location within a transparent portion of the remote desktop, a user-input action directed to a natively-operating application on a local desktop displayed through the transparent portion of the remote desktop; and
    passing the user-input action through the transparent portion of the remote desktop to the natively-operating application;
    wherein the network-hosted application is selected based on a ranking of the network-hosted application; and
    wherein the ranking is based on an error history for at least one of the application and a user interface feature of the application.

2. The method of claim 1, wherein establishing the registry includes listing, in the registry, a filename extension of a network-hosted file stored in a user's cloud storage service account.

3. The method of claim 1, wherein establishing the registry includes associating, in the registry, the filename extension with a group of network-hosted applications, each of the network-hosted applications being configured to process a file having the associated filename extension.

4. The method of claim 1, wherein the cloud computing service is provided via a remote desktop operating on the personal computing device.

5. The method of claim 1, wherein the ranking is based on at least one of a reputation associated with the application, and/or a brand name of the application.

6. The method of claim 1, further comprising preparing an image of a remote desktop including an open cloud-application window object corresponding to an instance of a network-hosted application executing on the network, the image of the remote desktop having a size conforming to a size of a local desktop of the computing device; encoding the image of the remote desktop as an image frame in a video stream adding a transparency channel to the video stream signal, the transparency channel carrying at least one value of a transparency attribute of the image, wherein the transparency channel configures the open cloud-application window to have a different transparency than another portion of the remote desktop; and transmitting the video stream signal to the personal computing device, wherein, when the video stream is presented at the personal computing device, at least a portion of a locally-operating application on the local desktop is at least partially visible through the another portion of the remote desktop.

7. The method of claim 6, wherein a user-input action within the other portion of the remote desktop is passed to the locally-operating application.

8. A system, comprising
    a server including at least one processor and at least one memory, the server hosted on a network having a communicative link to a personal computing device; and
    a registry associating a filename extension with a network-hosted application hosted at a website server remote from the personal computing device, the network-hosted application configured to process a file having the associated filename extension, the registry being stored on the website server, the website server configured to:

provide a cloud computing service to the personal computing device, the cloud computing service using the registry to select the network-hosted application to process, on the network, a network-hosted file having the associated filename extension, the network-hosted file being stored at a remote cloud data storage service and user-selected via the personal computing device, prepare an image of a remote desktop including an open cloud-application window object corresponding to an instance of a network-hosted application executing on the network, the image of the remote desktop having a size larger than the size of the open cloud-application window object, encode the image of the remote desktop as an image frame in a video stream signal, add a transparency channel to the video stream signal, the transparency channel carrying at least one value of a transparency attribute of the image, wherein the transparency channel configures the open cloud-application window to be at least partially opaque and another portion of the remote desktop to be at least partially transparent, transmit the video stream signal to the personal computing device, wherein, when the video stream is presented at the personal computing device, at least a portion of a locally-operating application on the local desktop is at least partially visible through the transparent portion of the remote desktop, wherein the registry includes a ranking of the network-hosted applications, and wherein the website server is further configured to:
  detect, at a location within the transparent portion of the remote desktop, a user-input action directed to the locally-operating application; and
  pass the user-input action through the transparent portion of the remote desktop to the locally-operating application;

wherein the cloud computing service is configured to select the network-hosted application to process the network-hosted file having the associated filename extension based on the ranking; and wherein the ranking is based on an error history for at least one of the application and a user interface feature of the application.

9. The system of claim 8, wherein the registry includes a listing of a filename extension of a network-hosted file stored in a user's cloud storage service account.

10. The system of claim 8, wherein the registry includes an association of the filename extension with a group of network-hosted applications, each of the network-hosted applications being configured to process a file having the associated filename extension.

11. The system of claim 8, wherein the server is configured to: prepare images of a remote desktop including an open cloud-application window object corresponding to an instance of a network-hosted application executing on the network, the images of the remote desktop having a size conforming to a size of a local desktop of the computing device.

12. A non-transitory computer-readable storage medium having instructions stored thereon, which instructions when executed by one or more microprocessors:
  store a registry on a website server, remote from a personal computing device, on a network, the registry associating a filename extension with a network-hosted web application hosted at the website server, the web application executed by a web browser executing on the personal computing device, the network-hosted web application configured to process a file having the associated filename extension; and provide a cloud computing service to the personal computing device communicatively linked to the network, the cloud computing service using the registry to select the network-hosted web application and website server to process, on the network, a network-hosted file having the associated filename extension, the network-hosted file being stored at a remote cloud data storage service and user-selected via the personal computing device, prepare an image of a remote desktop including an open cloud-application window object corresponding to an instance of a network-hosted application executing on the network, the image of the remote desktop having a size conforming to a size of a local desktop of the computing device, encode the image of the remote desktop as an image frame in a video stream signal, add a transparency channel to the video stream signal, the transparency channel carrying at least one value of a transparency attribute of the image, wherein the transparency channel configures the open cloud-application window to be substantially opaque and a portion of the remote desktop outside the open cloud-application window to be substantially transparent, transmit the video stream signal to the personal computing device, wherein, when the video stream is displayed at the personal computing device, at least a portion of a locally-operating application on the local desktop is at least partially visible through the transparent portion of the remote desktop, and wherein the instructions when executed by the one or more microprocessors:
    detect, at a location within the transparent portion of the remote desktop, a user-input action directed to the locally-operating application; and
    pass the user-input action through the transparent portion of the remote desktop to the locally-operating application;

wherein the cloud computing service is configured to select the network-hosted application to process the user-selected network-hosted file based on a rank ordering of network-hosted applications; and wherein the rank ordering is based on an error history for at least one of the application and a user interface feature of the application.

13. The non-transitory computer-readable storage medium of claim 12, wherein the registry includes a filename extension of a network-hosted file stored in a user's cloud storage service account.

14. The non-transitory computer-readable storage medium of claim 12, wherein the registry includes an association of the filename extension with a group of network-hosted applications, each of the network-hosted applications configured to process a file having the associated filename extension.

15. The non-transitory computer-readable storage medium of claim 12, wherein the cloud computing service is configured to present an application-selection dialog on the personal computing device to receive a user's choice of which one of a group of network-hosted applications is to be used to process the user-selected network-hosted file.

16. The non-transitory computer-readable storage medium of claim 12, wherein the cloud computing service is provided via a remote desktop operating on the personal computing device.

\* \* \* \* \*